Feb. 15, 1966     Q. L. HAMPTON     3,234,880
SCUM SKIMMING AND SLUDGE PUMPING DEVICE
Filed Dec. 22, 1964
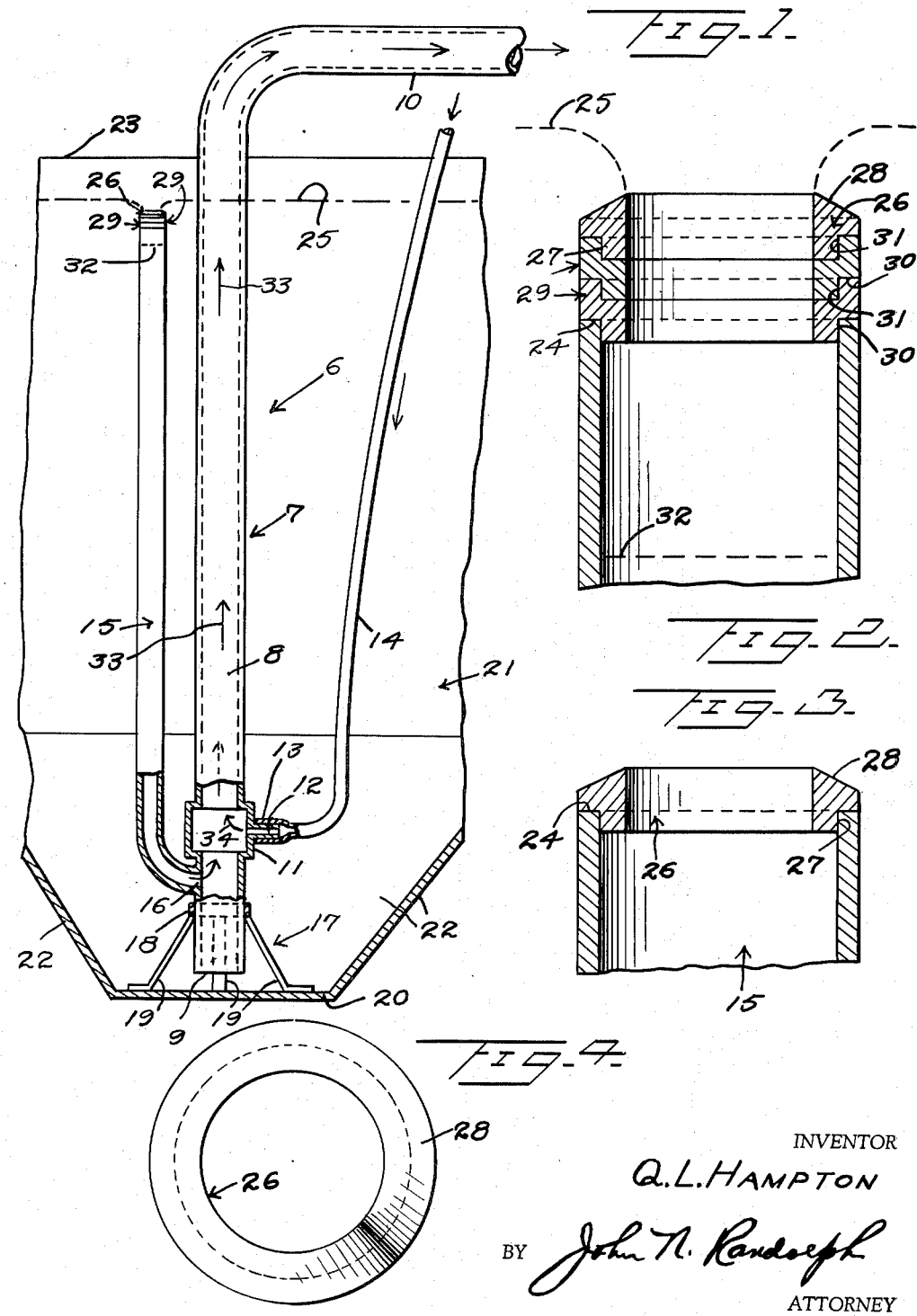
INVENTOR
Q. L. HAMPTON
BY John N. Randolph
ATTORNEY

United States Patent Office 3,234,880
Patented Feb. 15, 1966

3,234,880
SCUM SKIMMING AND SLUDGE
PUMPING DEVICE
Quentin L. Hampton, 64 Kent Drive, Ormond Beach, Fla.
Filed Dec. 22, 1964, Ser. No. 420,422
4 Claims. (Cl. 103—2)

This invention relates to a novel unitary apparatus for simultaneously pumping sludge from the bottom of a tank and for extracting scum from the surface of a liquid in the tank.

More particularly, it is an object of the present invention to provide an airlift pump having a lower inlet end disposed adjacent the bottom of a tank and a scum pipe having a lower outlet end communicating with the airlift pipe between the said inlet end and the airlift pipe connection through which air is supplied under pressure to the airlift pipe, whereby a negative pressure is produced in the scum pipe for drawing scum downwardly therethrough for discharge into the airlift pipe, when air is supplied under pressure to the airlift pipe for extracting sludge from the tank bottom.

A further object of the invention is to provide novel means for varying the level of an upper inlet end of the scum pipe for adjusting the level of said inlet end to the level of the liquid in the tank.

Various other objects and advantages of the invention will hereinafter become more full apparent from the following description of the drawing, illustrating a presently preferred embodiment thereof, and wherein:

FIGURE 1 is a fragmentary side elevational view, partly in vertical section, showing the scum skimming and sludge pumping device in an applied position;

FIGURE 2 is an enlarged fragmentary vertical sectional view of the upper portion of the scum conduit with the upper inlet end thereof shown elevated;

FIGURE 3 is a view similar to FIGURE 2 with the inlet end of the scum pipe lowered; and FIGURE 4 is a top plan view of the part constituting the inlet of the scum pipe.

Referring more specifically to the drawing, the scum skimming and sludge pumping device in its entirely and comprising the invention is designated generally 6 and includes a rigid airlift pipe or conduit 7 having an upright portion 8 which is provided with an open lower inlet end 9. The pipe portion 8 has a laterally turned extension 10 forming an integral continuation of its upper end. The pipe portion 8 is preferably provided with an enlargement 11, above but adjacent its lower inlet end 9, which is provided with a nipple 12 which opens into the enlarged portion 11 and outwardly thereof. The outlet end 13 of an air hose or conduit 14 is connected to an outer portion of the nipple 12.

A rigid scum pipe 15 has a lower outlet end 16 which is joined to and communicates with the air pipe portion 8 between the nipple 12 and the inlet 9. The outlet end 16 may be formed integral with the pipe portion 8, as illustrated, or may be suitably joined rigidly therewith.

The pumping and skimming device 6 is shown in FIGURE 1 supported by a stand 17 having a collar 18 which is suitably secured around the pipe portion 8 beneath the outlet 16, and legs 19 which extend downwardly therefrom. The out-turned lower end of the legs 19 are shown engaging on the upper side of the bottom 20 of a tank 21. The walls of the tank 21 are shown provided with downwardly converging lower portions 22 to form a hopper-type tank bottom. Stand 17 supports the downwardly opening inlet end 9 slightly above the tank bottom 20, and the pipe portion 8 is of a length to extend to above the rim 23 of the tank.

The scum pipe 15 is of a length such that its open upper end 24 terminates below the liquid level 25 of the tank 21. A ring 26 has an externally recessed annular bottom portion 27 of a proper size and shape to engage in and on the upper end 24 of the pipe 15, and said ring constitutes the inlet of said scum pipe. The top surface of the ring 26 is bevelled, as seen at 28. One or a plurality of elevating rings 29, as illustrated in FIGURE 3, may be interposed between the inlet ring 26 and the upper end 24 for elevating the inlet 26 relative to said pipe end 24 to compensate for a higher liquid level 25 in the tank. Each ring 29 has an externally recessed bottom portion 30, corresponding to the recess 27, and an internally recessed top portion 31. The recessed bottom portion 30 of the lower ring 29 fits into and on the pipe end 24, and the internally recessed top portion 31 thereof interengages with the externally recessed bottom portion of the upper ring 29. The recessed bottom portion 27 of the inlet ring 26 engages the internally recessed top portion 31 of the upper ring 29, in the same manner as said portion 27 engages the pipe end 24 in FIGURE 3. The hose or conduit 14 extends outwardly from above the tank 21 and has an opposite inlet end, not shown, connected to any suitable source of air under pressure. The pipe portion 10 which constitutes the outlet or discharge of the airlift pump conduit 7 is disposed above the tank rim 23 and said portion 10, or an extension thereof, extends laterally to beyond one of the vertical walls of tank 21 and to any suitable point of discharge.

When air is supplied under pressure to the pipe portion 8 through the hose or conduit 14, a suction will be created in the lower part of the pipe portion 8 and in the inlet 9 for drawing sludge, not shown, from the lower part of the tank 21 through said inlet 9 and upwardly through the pipe portion 8 into the pipe portion 10. When this occurs, a negative pressure will be produced in the pipe 15 for lowering the liquid level 32 therein so that scum on the surface 25 will be drawn through the inlet 26 and down into the pipe 15. This scum will be extracted by suction from the pipe 15 through its outlet 16 to mingle with and flow upwardly through the pipe portion 8 with the sludge, as indicated by the arrows 33, and also with the air entering the pipe portion 8 from the nipple 12, as indicated by the arrow 34. The air, sludge and scum will be discharged through the outlet portion 10.

It will thus be seen that the device 6 provides a novel unitary structure employing only a single air conduit having a single discharge into the apparatus for simultaneously educting sludge from the bottom of a tank and skimming scum from the surface of the liquid within the tank.

It will also be readily apparent that the apparatus 6 could be suspended from above in a manner such as illustrated in my prior Patent No. 3,132,773, issued May 12, 1964, for movement in a tank having a flat bottom, and various other modifications and changes are contemplated and may obviously be resorted to, without departing from the function or scope of the invention as hereinafter defined by the appended claims.

I claim as my invention:

1. In combination with an airlift pump including a conduit having a lower inlet end adapted to be disposed adjacent the bottom of a liquid containing tank and an outlet end adapted to discharge externally of the tank, and means for supplying air under pressure to said conduit above and adjacent said inlet end for extracting sludge from the tank bottom; a scum conduit having a lower outlet end opening into the airlift pump conduit between the inlet end thereof and said means for supplying air under pressure thereto for creating a negative pressure in the scum conduit, and said scum conduit having an upper inlet end adapted to be disposed beneath and adjacent the liquid level in the tank for skimming scum therefrom when a suction is created in the scum conduit.

2. In a combination as defined by claim 1, and means for varying the elevation of said inlet end of the scum conduit to compensate for variations in the liquid level of the tank.

3. In a combination as defined by claim 1, said scum conduit comprising a rigid pipe having an upwardly opening upper end, and a ring member detachably mounted on said upper end of the pipe and constituting the scum conduit inlet, said ring member having an outwardly and downwardly bevelled top surface.

4. In a combination as defined by claim 1, said scum conduit comprising a rigid pipe having an upwardly opening upper end, at least one elevating ring detachably mounted on and extending upwardly from said upper end, and a ring member detachably mounted on and disposed above said elevating ring and constituting the inlet end of said scum conduit.

References Cited by the Examiner
UNITED STATES PATENTS

| | | | |
|---|---|---|---|
| 1,181,783 | 5/1916 | Lyons | 222—464 |
| 3,053,390 | 9/1962 | Wood | 210—194 |

DONLEY J. STOCKING, *Primary Examiner.*

LAURENCE V. EFNER, *Examiner.*